US012684536B2

(12) United States Patent
Zhao

(10) Patent No.: US 12,684,536 B2
(45) Date of Patent: Jul. 14, 2026

(54) TRANSMISSION RESOURCE SELECTION METHOD AND APPARATUS, DEVICE, AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 332 days.

(21) Appl. No.: 18/560,208

(22) PCT Filed: May 11, 2021

(86) PCT No.: PCT/CN2021/093070
§ 371 (c)(1),
(2) Date: Nov. 10, 2023

(87) PCT Pub. No.: WO2022/236683
PCT Pub. Date: Nov. 17, 2022

(65) Prior Publication Data
US 2024/0357553 A1      Oct. 24, 2024

(30) Foreign Application Priority Data

May 10, 2021    (WO) ................ PCT/CN2021/092918

(51) Int. Cl.
*H04W 72/02*      (2009.01)
*H04W 28/26*      (2009.01)
*H04W 72/0446*    (2023.01)

(52) U.S. Cl.
CPC ........... *H04W 72/02* (2013.01); *H04W 28/26* (2013.01); *H04W 72/0446* (2013.01)

(58) Field of Classification Search
CPC . H04W 72/02; H04W 28/26; H04W 72/0446; H04W 72/04; H04W 92/18; H04W 72/569; H04W 72/25; H04W 72/40; H04W 74/0808; H04W 4/40; H04W 72/542; H04W 72/56; Y02D 30/70; H04L 47/245
See application file for complete search history.

(56) References Cited

U.S. PATENT DOCUMENTS

| 2020/0259601 A1 | 8/2020 | Zhou et al. | |
|---|---|---|---|
| 2023/0180185 A1* | 6/2023 | Ye | H04W 52/0216 370/329 |
| 2024/0015703 A1* | 1/2024 | Lin | H04W 72/02 |

FOREIGN PATENT DOCUMENTS

| CN | 111919500 A | 11/2020 |
|---|---|---|
| CN | 112291836 A | 1/2021 |

(Continued)

OTHER PUBLICATIONS

Apple. "Discussion on Sidelink Resource Allocation for Power Saving", 3GPP TSG RAN WG1 #104b-e, R1-2103121, Apr. 2021, 13 pages, XP052177922.

(Continued)

*Primary Examiner* — Chae S Lee

(74) *Attorney, Agent, or Firm* — Oblon, McClelland, Maier & Neustadt, L.L.P.

(57) ABSTRACT

A method is performed by a terminal, and includes: determining a target transmission resource in a resource selection process, and processing the target transmission resource by using a partial listening-based re-evaluation and/or preemption process.

19 Claims, 5 Drawing Sheets

(56)                    References Cited

FOREIGN PATENT DOCUMENTS

| | | | |
|---|---|---|---|
| CN | 112385291 A | 2/2021 | |
| CN | 113455078 A | 9/2021 | |
| EP | 4280728 A1 * | 11/2023 | ........... H04L 5/0033 |

OTHER PUBLICATIONS

Moderator (OPPO). "FL summary for AI 8.11.1.1—resource allocation for power saving (final)", 3GPP TSG RAN WG1 #104b-e. R1-2194093, Apr. 2021, 122 pages, XP051896662.

NTT Docomo, Inc., "Discussion on sidelink resource allocation for power saving", 3GPP TSG RAN WG1 #104bis-e. R1-2103592. Apr. 2021, 16 pages, XP051993440.

Extended European Search Report issued Mar. 14, 2025 in European Patent Application No. 21941259.0, 12 pages.

International Search Report mailed on Dec. 28, 2021 in PCT/CN2021/093070 filed on May 11, 2021 (with English Translation, therein, 4 pages).

Chinese Office Action issued Jul. 5, 2022 in CN 202180001519.X, 5 pages.

"Discussion on Sidelink Resource Allocation Enhancement for Power Saving", Xiaomi, 3GPP TSG RAN WG1 #104b-e, RI-2102965, Apr. 7, 2021 (Apr. 7, 2021), 7 pages.

"Discussion on Resource Allocation for Power Saving", Sharp, 3GPP TSG RAN WG1 Meeting #104bis-e, RI-2103483, Apr. 7, 2021 (Apr. 7, 2021), 10 pages.

"Discussion on Sidelink Resource Allocation Enhancement for Power Saving", InterDigital, Inc., 3GPP TSG RAN WG1 #103-e, RI-2009121, 2020, 4 pages.

* cited by examiner

TRANSMISSION RESOURCE SELECTION METHOD AND APPARATUS, DEVICE, AND STORAGE MEDIUM

CROSS-REFERENCE TO RELATED APPLICATIONS

The present application is a U.S. National Stage of International Application No. PCT/CN2021/093070, filed on May 11, 2021, which claims priority to PCT Application No. PCT/CN2021/092918 and titled "transmission resource selection method and apparatus, device and storage medium," filed on May 10, 2021, the contents of all of which are incorporated by reference herein in their entireties for all purposes.

TECHNICAL FIELD

The present disclosure relates to the field of mobile communications, and in particular relates to transmission resource selection method and apparatus, device and storage medium.

BACKGROUND

In order to achieve direct communication between terminals in the Vehicle to everything (V2X) system, the Side Link (SL) transmission method is introduced.

SUMMARY

The embodiments of the present disclosure provide transmission resource selection method, device, apparatus and storage medium, which can perform re-evaluation and/or pre-emption process based on partial listening for the transmission resource. The technical solutions are as follows.

According to an aspect of the present disclosure, there is provided a transmission resource selection method, performed by a terminal for V2X transmission, including: determining a target transmission resource during a resource selection process; and processing the target transmission resource using a re-evaluation and/or a pre-emption process based on partial listening.

According to an aspect of the present disclosure, there is provided a terminal device, including a processor and a transceiver connected to the processor; wherein, the processor is configured to determine a target transmission resource during a resource selection process; and process the target transmission resource using a re-evaluation and/or a pre-emption process based on partial listening.

According to an aspect of the present disclosure, there is provided a computer readable storage medium, storing executable instructions, where the executable instructions are loaded and executed by a processor to achieve the method according to the above aspects.

BRIEF DESCRIPTION OF THE DRAWINGS

In order to more clearly illustrate the technical solutions in the embodiments of the present disclosure, the drawings required for the description of the embodiments will be briefly introduced below. It is apparent that the drawings described below are only some embodiments of the present disclosure. For those skilled in the art, other drawings can be obtained based on these drawings without creative effort.

DETAILED DESCRIPTION

Figure 1:
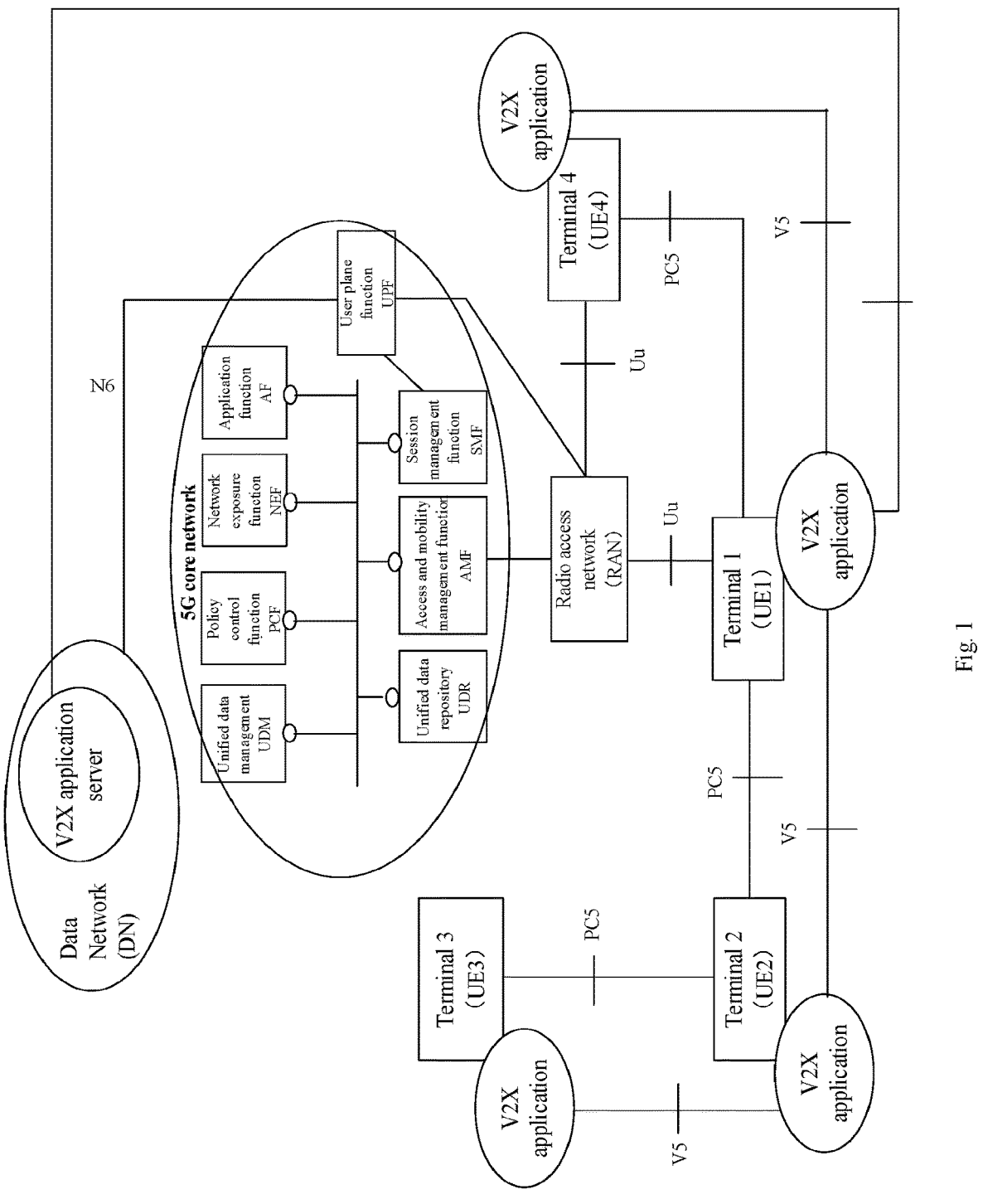
FIG. 1 is a schematic diagram of a system architecture provided by an exemplary embodiment of the present disclosure.

To make the purpose, technical solution and advantages of the present disclosure clearer, the embodiments of the present disclosure will be further described in detail in combination with the accompanying drawings.

The exemplary embodiments will be described in detail hereinafter, and the examples are shown in the accompanying drawings. When the following description refers to the accompanying drawings, unless otherwise indicated, the same numerals in different drawings indicate the same or similar elements. The embodiments described in the following exemplary embodiments do not represent all embodiments consistent with the present disclosure. Instead, they are only examples of devices and methods consistent with some aspects of the present disclosure as detailed in the accompanying claims.

The terms used in this disclosure are for the purpose of describing specific embodiments only, and are not intended to limit the disclosure. The singular forms of "a", "said", and "the" used in this disclosure and the attached claims are also intended to include the plural forms, unless the context clearly indicates otherwise. It should also be understood that the term "and/or" used herein refers to and includes any or all possible combinations of one or more associated listed items.

It should be understood that although the terms first, second, third, etc. may be used in this disclosure to describe various information, these terms should not be limited to these specific meanings. These terms are merely used to distinguish one type of information from another. For example, without departing from the scope of this disclosure, the first information may also be referred to as the second information, and similarly, the second information may also be referred to as the first information. Depending on the context, the word "if" as used herein may be interpreted as "when" or "in response to determining . . .". First, a brief introduction to the terms involved in the embodiments of the present disclosure is provided.

Vehicle to everything (V2X): It is a key technology for future intelligent transportation system, mainly researching vehicle data transmission solutions based on 3GPP communication protocol. V2X communication includes vehicle-to-vehicle (V2V) communication, vehicle-to-infrastructure (V2I) communication, and vehicle-to-people (V2P) communication. The V2X application will improve driving safety, reduce congestion and vehicle energy consumption, and improve traffic efficiency, etc.

Side Link (SL) transmission: It is a device-to-device communication method with high spectral efficiency and low transmission delay. Side Link has two transmission modes. The first transmission mode is where the network device allocates a transmission resource for the terminal device, and the terminal device performs side link data transmission on the configured transmission resource. The second transmission mode is where the network device allocates a resource pool for the terminal device, and the terminal device automatically select one or more transmission resource from the resource pool for side link data transmission. For example, the terminal device can select a transmission resource in the resource pool by listening, or the terminal device can select a transmission resource in the resource pool by random selection.

In the second transmission mode, the terminal device needs to maintain channel listening to select a resource. When resource selection is triggered, the terminal device determines the resource selection window and candidate resource set, removes candidate resources with strong expected interference from the resource selection window based on the channel listening result, and randomly selects from the remaining candidate resource set. In order to save energy, an effective method is to reduce the time for channel listening by the terminal device, and the terminal device only performs channel listening during part of the time. LTE (Long Term Evolution)-V2X in some embodiments supports resource selection for partial listening, and defines the channel listening condition that needs to be met for resource selection for partial listening.

In some embodiments, the side link resource selection supports pre-emption and re-evaluation mechanisms, which also rely on channel listening. Before using the selected transmission resource for side link transmission, the terminal device needs to re-evaluate whether the selected transmission resource is still suitable for transmission based on the listening result. If not suitable, it is necessary to re-select a resource. When the selected transmission resource is not reserved by other transmissions, it is called re-evaluation; and when the selected time-frequency resource has been reserved by other transmissions, it is called pre-emption. According to the channel listening result, if other side link transmissions occupy the selected transmission resource and meet the configured priority and S-RSRP measurement condition, the user needs to re-select a resource and give up the transmission on the originally selected transmission resource.

For resource selection based on partial listening in LTE V2x, the terminal device only selects a part of time units in the resource selection window. The terminal device only needs to listen to the selected part of time units, and does not need to listen to every time unit. The terminal device is only allowed to determine the candidate resource set within this part of time units, that is, to determine whether the transmission resource is occupied by other side-link transmissions based on the listening result. If occupied, the time-frequency resource will be excluded from the candidate resource set.

Resource re-evaluation and pre-emption are functions introduced in some embodiments. When performing judgment of resource re-evaluation and pre-emption, the terminal device needs to re-determine whether the transmission resource to be transmitted still belongs to the candidate transmission resource. In order to reduce the length of time the terminal device needs to listen, a partial listening concept is introduced for resource re-evaluation and pre-emption to save energy.

FIG. 1 shows a block diagram of a communication system supporting side link transmission provided by an exemplary embodiment of the present disclosure. The communication system can be a schematic diagram of Non-roaming 5G system architecture, and the system architecture can be applied to the Vehicle to everything (V2X) service using D2D (Device to Device) technology.

The system architecture includes a data network (DN), and the data network is equipped with a V2X application server required for V2X service. The system architecture also includes a 5G core network, the network functions of the 5G core network include: unified data management (UDM), policy control function (PCF), network exposure function (NEF), application function (AF), unified data repository (UDR), access and mobility management function (AMF), session management function (SMF), and user plane function (UPF).

The system architecture also includes a New Generation-Radio Access Network (NG-RAN) and four exemplarily shown terminals (i.e., terminal 1 to terminal 4). Optionally, each terminal is equipped with a V2X application or an application that supports SL transmission. One or more access network devices, such as base stations (gNBs), are set up in the wireless access network.

In the system architecture, the data network is connected to the user plane function in the 5G core network through the N6 reference point, and the V2X application server is connected to the V2X application in the terminal through the V1 reference point. The wireless access network is connected to the AMF function and UPF function in the 5G core network, and the wireless access network is connected to terminal 1 and terminal 5 through the Uu reference point. Side link transmission among a plurality of terminals is performed through the PC5 reference point, and a plurality of V2X applications are connected through the V5 reference point. The above reference points can also be referred to as "interfaces".

The "5G NR system" in the embodiments of the present disclosure can also be referred to as the 5G system or NR system, but the meaning can be understood by those skilled in the art. The technical solutions described in the embodiments of the present disclosure can be applied to the 5G NR system, and also can be applied to a subsequent evolution system of the 5G NR system. The technical solutions described in the embodiments of the present disclosure can be applied to a V2x application, and also can be applied to other application using side link transmission, such as public safety and commercial applications.

Figure 2:
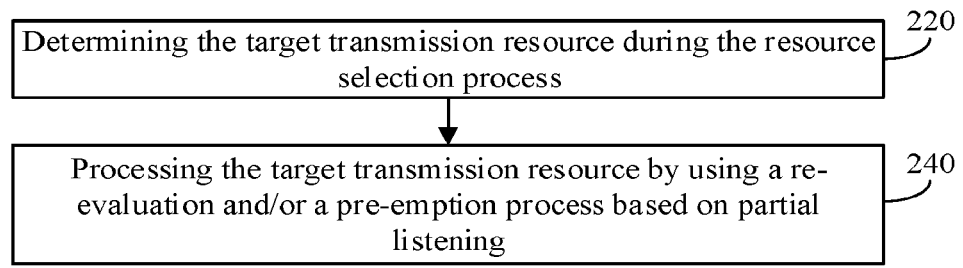
FIG. 2 is a flowchart of a method for selecting a transmission resource provided by an exemplary embodiment of the present disclosure.

Please refer to FIG. 2, which shows a flowchart of a method for selecting a transmission resource provided by an embodiment of the present disclosure. The method can be applied to the system architecture shown in FIG. 1. The method includes the following steps.

Step 220: The terminal device determines the target transmission resource during the resource selection process.

When the terminal device operates in the second mode of the side link, the terminal device can obtain first side link control information transmitted by other terminal devices by listening to the PSCCH (Physical Side-link Control Channel) transmitted by other terminal devices, and thus can know the resources reserved by other terminal devices. When selecting resources, the terminal device will exclude the resources reserved by other terminal devices, thus avoiding resource collision.

Figure 3:
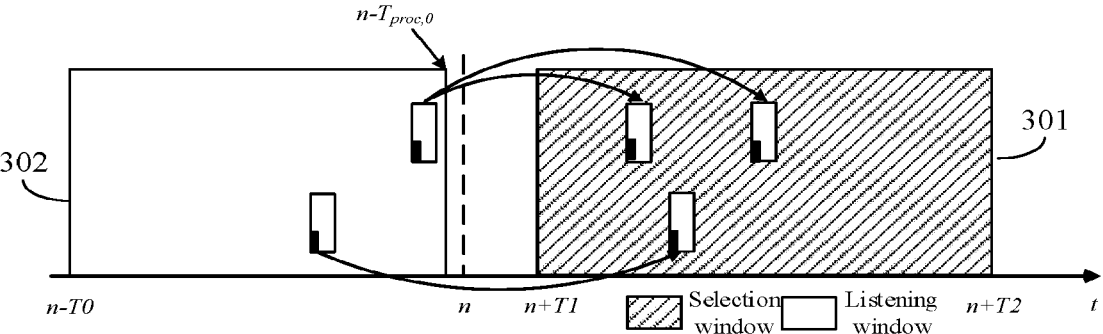
FIG. 3 is a schematic diagram of a method for selecting a transmission resource provided by an exemplary embodiment of the present disclosure.

As shown in FIG. 3, the data packet of the terminal device arrives in time slot n, triggering resource selection. The resource selection window (the second resource selection window 301) starts at time n+T1 and ends at time n+T2. Where, $0 \leq T1 \leq T_{proc,1}$, $T_{proc,1}$ is the time for the terminal device to select resources and prepare data; when the sub-carrier spacing is 15 kHz, 30 kHz, 60 kHz, 120 kHz, $T_{proc,1}$ corresponds to 3, 5, 9, 17 time slots; $T2_{min} \leq T2 \leq$ Packet Delay Budget (PDB). The value set of $T2_{min}$ is $\{1, 5, 10, 20\}*2^{\mu}$ time slots, where $\mu=0, 1, 2, 3$ corresponds to the sub-carrier spacing of 15 kHz, 30 kHz, 60 kHz, 120 kHz respectively. The terminal device determines $T2_{min}$ from the value set according to the priority of its own data to be transmitted. When $T2_{min}$ is greater than the packet delay budget, T2=packet delay budget to ensure that the terminal device can transmit the data packet before the maximum packet delay arrives.

The terminal device performs resource listening in the resource listening window (second resource listening window 302) from n−T0 to n−$T_{proc,0}$. The value of T0 is 100 or 1100 milliseconds. $T_{proc,0}$ is the time for the terminal device to decode control information. When the sub-carrier spacing is 15 kHz, 30 kHz, 60 kHz, or 120 kHz, $T_{proc,0}$ is 1, 1, 2, or 4 timeslots, respectively.

Taking full listening as an example, the resource selection process for a target transmission resource includes two steps. Step 1: the terminal device determines a candidate resource set. Step 2: the terminal device selects a target transmission resource from the candidate resource set.

Step 1: the terminal device determines a candidate resource set.

The terminal device takes all available resources in the second resource selection window as a resource set A.

If the terminal device transmits data in some time slots within the second resource listening window, then due to the limitation of half-duplex, the terminal device will not listen on these time slots. Therefore, the terminal device needs to remove the resources on time slots within the second resource selection window corresponding to these time slots from the resource set A, so as to avoid resource conflicts with other terminal devices. Specifically, when determining time slots within the second resource selection window corresponding to these time slots, the terminal device uses the value set of the resource reservation period field in the resource pool configuration to determine time slots within the selection window corresponding to these time slots, and excludes all resources on the corresponding time slots from the resource set A.

If the terminal device detects the PSCCH within the second resource listening window, it measures the RSRP (Reference Signal Received Power) of the PSCCH or the RSRP of the PSSCH (Physical Side-link Shared Channel) scheduled by the PSCCH. If the measured RSRP is greater than the SL-RSRP threshold, and a reserved resource is determined to be within the second resource selection window based on the resource reservation information in the side-link control information transmitted in the PSCCH, the reserved resource is excluded from the resource set A. If the remaining resources in the resource set A are less than X % of all resources in the resource set A before resource exclusion, the SL-RSRP threshold is raised by 3 db and Step 1 is re-executed. The possible values of X are 20, 35, and 50, and the terminal device determines the parameter X from the set of values based on the priority of the data to be transmitted. At the same time, the SL-RSRP threshold is related to the priority carried in the PSCCH detected by the terminal device and the priority of the data to be transmitted by the terminal device. The terminal device uses the remaining resources after resource exclusion in the resource set A as a candidate resource set.

Step 2: The terminal device selects a target transmission resource from the candidate resource set.

After resource exclusion, the terminal device randomly selects several resources from the candidate resource set as the resources used by the terminal device during initial transmission and retransmission.

In Step 2, resource selection needs to meet some time-domain constraints, mainly including the following two points.

1) After removing some exceptions, the terminal device should enable a selected resource to be indicated by the previous resource of the selected resource, that is, the time domain interval between the two resources is less than 32 time slots. The exceptions include the inability of the terminal device to select a resource that meets the time domain restriction from the candidate resource set after resource exclusion, and the violation of the time domain restriction due to resource pre-emption or congestion control after the resource selection is completed.

2) The terminal device should ensure that for any two selected time-frequency resources, if the first transmission resource requires HARQ (Hybrid Automatic Repeat reQuest) feedback, then these two resources are separated by at least time interval Z in the time domain. The time interval Z includes the time that the terminal device waits for the HARQ feedback from the receiving side and the time that the terminal device prepares to retransmit data. When resource selection cannot meet the time domain restriction, depending on the terminal implementation, it may be necessary to discard some retransmission resource or deactivate HARQ feedback for some transmission resource.

For example, the target transmission resource determined in the resource selection process in step 220 can be the following.

1) A candidate resource set selected by the terminal device from the second resource selection window before resource exclusion (for example, the target transmission resource includes Y candidate time units). The terminal device selects a candidate resource set from the second resource selection window, obtains a listening result by listening using a partial listening approach based on the candidate resource set, performs resource exclusion on the candidate resource set based on the listening result, and selects the final selected transmission resource from the candidate resource set after resource exclusion.

2) A candidate transmission resource selected by the terminal device from the second resource selection window before resource exclusion, and a candidate resource set by performing periodic resource reservation based on the candidate transmission resource (for example, the target transmission resource include Y candidate time units, and Y*k reserved time units obtained by performing periodic resource reservation based on the Y candidate time units). The terminal device selects candidate transmission resource from the second resource selection window, obtains reserved transmission resource by performing periodic resource reservation based on the candidate transmission resource, performs resource exclusion on the candidate resources based on the listening result, and selects the final transmission resource from the candidate resources after resource exclusion. The target transmission resource include a candidate resource set including the candidate transmission resource and the reserved transmission resource of the candidate transmission resource.

3) An available resource set obtained by the terminal device after resource exclusion. The terminal device performs resource exclusion on the transmission resource in the second resource selection window based on the listening result, and obtains the available resource set after resource exclusion. The final selected transmission resource is selected from the available resource set.

4) Available transmission resource obtained by the terminal device after resource exclusion, and an available resource set obtained by performing periodic resource reservation based on the available transmission resource. The terminal device performs resource exclusion on the transmission resource in the second resource selection window based on the listening result, obtains the available resource set after resource exclusion, obtains the reserved transmission resource by performing periodic resource reservation based on the available resource set, and selects the final selected transmission resource from the available resource set.

5) A selected transmission resource set finally selected by the terminal device after the resource selection process (for example, the target transmission resource include B time units). The terminal device performs resource exclusion based on the listening result, and selects the final selected transmission resource set from the remaining transmission resource after resource exclusion.

6) Selected transmission resource finally selected by the terminal device through the resource selection process, and the selected transmission resource set obtained by periodic resource reservation based on the selected transmission resource (for example, the target transmission resource include B time units, and B*k reserved time units obtained by periodic resource reservation based on B time units). The terminal device performs resource exclusion based on the listening result, selects the final selected transmission resource from the remaining transmission resource after resource exclusion, performs periodic resource reservation based on the selected transmission resource, and finally obtains the selected transmission resource set including the selected transmission resource and the reserved transmission resource of the selected transmission resource.

Step 240: The terminal device uses a re-evaluation and/or a pre-emption process based on partial listening to process the target transmission resource.

NR-V2X supports a re-evaluation mechanism. After the terminal device completes resource selection, resources that have been selected but not yet indicated by transmitting side-link control information may still be reserved by other terminal devices, resulting in resource collisions. To address this issue, a re-evaluation mechanism is proposed, in which the terminal device continues to listen to side-link control information after completing resource selection, and performs at least one re-evaluation for the selected but not indicated resources.

Figure 4:
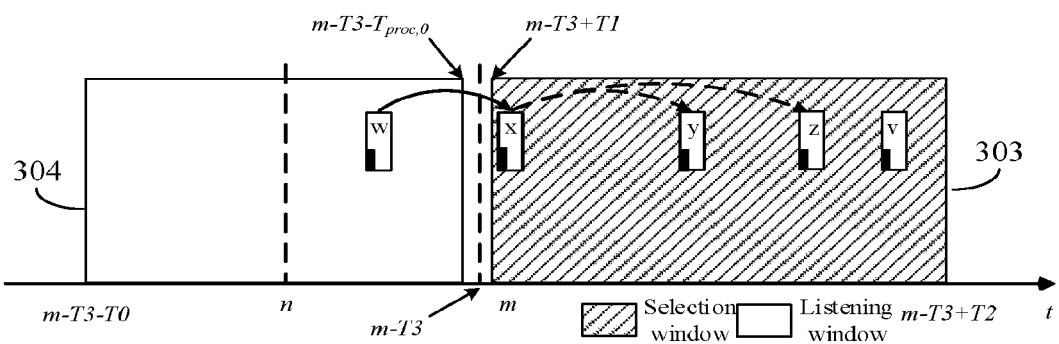
FIG. 4 is a schematic diagram of a method for selecting a transmission resource provided by an exemplary embodiment of the present disclosure.

As shown in FIG. 4, resource w, resource x, resource y, resource z, resource u, and resource v are the target transmission resource (selected transmission resource set) selected by the terminal device in time slot n. Resource x is located in time slot m. For resource y and resource z indicating for the first time that the terminal device is about to transmit side-link control information in resource x (resource x has been previously indicated by side-link control information in resource w), the terminal device at least performs the above Step 1 in time slot m−T3 once for re-evaluation, that is, the terminal device determines the first resource selection window 303 and the first resource listening window 304, and excludes resources within the first resource selection window 303 to obtain a candidate resource set. If resource y or resource z is not in the candidate resource set, the terminal device performs the above Step 2 to re-select the time-frequency resources that are not in the candidate resource set in resource y and resource z, or re-select any resources that have been selected but not indicated by side-link control information, such as any of resource y, resource z, and resource v. The above T3 is equal to $T_{proc,1}$. The dotted arrow in FIG. 4 indicates that side-link control information is about to be transmitted, and the solid arrow indicates that side-link control information has already been transmitted.

NR-V2X supports the pre-emption mechanism. In NR-V2X, the conclusions about the pre-emption mechanism are described from the perspective of the pre-empted terminal device. After completing resource selection, the terminal device continues to listen to side-link control information. If the selected time-frequency resource indicated by the side-link control information meets the following three conditions, it indicates that the selected resource has been pre-empted by other terminal devices, and the terminal device triggers resource reselection for the selected resource.

Condition 1: The reserved resource in the listened side-link control information overlaps with the selected and indicated resource of the terminal device, including full overlap and partial overlap.

Condition 2: The RSRP of the PSCCH corresponding to the side-link control information listened by the terminal device or the RSRP of the PSSCH scheduled by the PSCCH is greater than the SL-RSRP threshold.

Condition 3: The priority level carried in the listened side-link control information is higher than the priority level of the data to be transmitted by the terminal device, and other configuration conditions are met.

For example, the associated priority $prio_{RX}$ satisfies one of the following conditions.

SL-Pre-emptionEnable is provided and is equal to 'enabled' and $\text{prio}_{TX} > \text{prio}_{RX}$ (parameter SL-Pre-emptionEnable is configured and in the enabled state, and the transmitting priority $\text{prio}_{TX}$ is higher than the receiving priority $\text{prio}_{RX}$);

SL-Pre-emptionEnable is provided and is not equal to 'enabled', and $\text{prio}_{TX} < \text{prio}_{pre}$ and $\text{prio}_{TX} > \text{prio}_{RX}$ (parameter SL-Pre-emptionEnable is configured and in the disabled state, and the receiving priority $\text{prio}_{RX}$ is less than the configured or preconfigured priority $\text{prio}_{pre}$, and the transmitting priority $\text{prio}_{TX}$ is higher than the receiving priority $\text{prio}_{RX}$).

Figure 5:
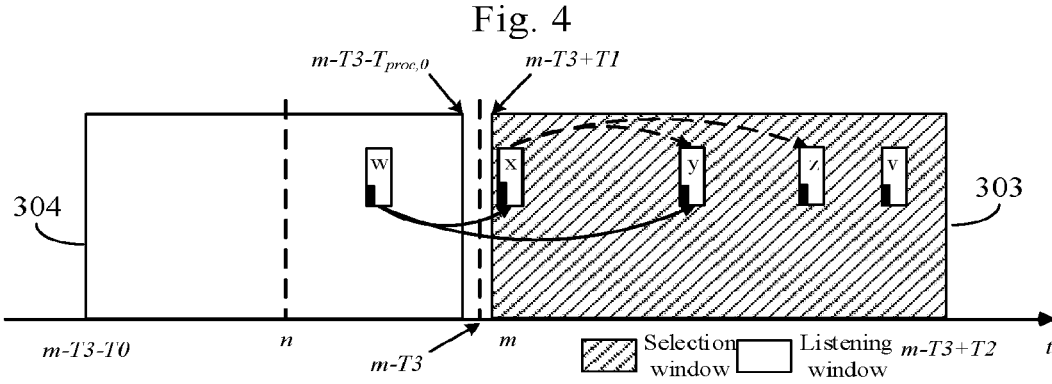
FIG. 5 is a schematic diagram of a method for selecting a transmission resource provided by an exemplary embodiment of the present disclosure.

As shown in FIG. 5, resources w, x, y, z, and v are time-frequency resources that have been selected by the terminal device in time slot n. Resource x is located in time slot m. For resources x and y that is indicated by the side-link control information to be transmitted by the terminal device in time slot m and have been indicated by the side-link control information previously transmitted by the terminal device, the terminal device at least performs the above steps 1 in time slot m−T3 once, that is, the terminal device determines the first resource selection window 303 and the first resource listening window 304, and excludes resources within the first resource selection window 303 to determine the candidate resource set. If resource x or y is not in the candidate resource set (satisfying the above conditions 1 and 2), it is further determined whether resource x or y is not in the candidate resource set due to the indication of side-link control information carrying high priority (higher priority than the data to be transmitted by the terminal device) (satisfying the above condition 3). If so, the terminal device performs step 2 to re-select time-frequency resources that meet the above three conditions among resources x and y. In addition, after triggering resource re-selection, the terminal device can re-select any selected resources that have not been indicated by the transmitting side-link control information, such as any of resources z and v. The above T3 is equal to $T_{proc,1}$.

When re-evaluating the resources within the first resource selection window corresponding to time slot m, the aforementioned R-evaluation mechanism and/or Pre-emption mechanism need to use the method of Step 1 to exclude the resources occupied by other terminal devices from the first resource selection window based on the listening of side-link control information in the first resource listening window and corresponding RSRP measurements, to obtain a candidate resource set, and then determine whether the selected resources are included in the candidate resource set. If not, it indicates that the selected resources have been preempted, triggering resource reselection; if so, it indicates that the selected resources have not been preempted. Using this method requires the listening of most of the time-frequency resources in the first resource listening window (except for the time slots in which the terminal device transmits data), and the terminal device needs to perform long-term listening, which is energy-consuming.

The method of this embodiment uses partial listening when performing re-evaluation and/or pre-emption for time slot m. That is, selecting some candidate time units in the first resource selection window, and then conducting partial listening of the time-frequency resources corresponding to the candidate time units in the first resource listening window, and determining whether the candidate time units are occupied by other terminal devices based on the listening result. The terminal device does not need to listen all the time-frequency resources in the first resource listening window. During the reevaluation and/or pre-emption process of the selected resources by the terminal device, the listening duration of the terminal device is reduced, and the energy consumption of the terminal device is reduced.

For example, the time slots and time units mentioned in the embodiments of this disclosure can refer to physical time, such as 1 us (microsecond), 1 ms (millisecond), 1 symbol, 1 slot, 1 subframe, 1 frame; or can refer to logical time, such as defining a set of all time-domain resources that can be used for side-link communication as a logical time set, or defining all time-domain resources in the Tx (Transmit) resource set as a logical time set, and mapping physical time to the logical time set.

To sum up, the method provided in this embodiment employs a partial listening approach to perform the re-evaluation and pre-emption mechanism during the process of listening and determining the target transmission resource using the re-evaluation and pre-emption mechanism after determining the target transmission resource, thereby reducing the length of time that the terminal device needs to listen and saving energy for the terminal device.

Exemplarily, when the terminal device performs re-evaluation and/or pre-emption based on partial listening for the time-frequency resources within the time unit u, it selects candidate time units from the first resource selection window of the re-evaluation and/or pre-emption, and performs re-evaluation and/or pre-emption based on partial listening for the candidate time units.

Figure 6:
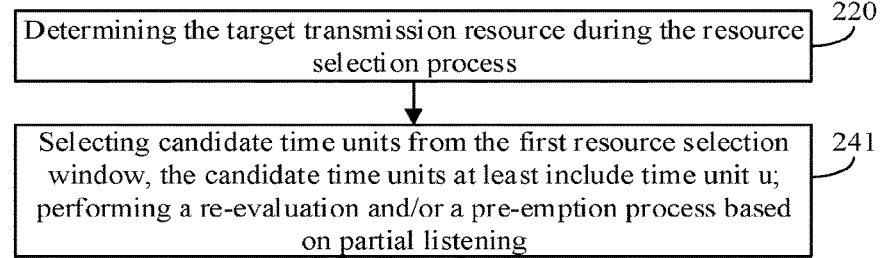
FIG. 6 is a flowchart of a method for selecting a transmission resource provided by an exemplary embodiment of the present disclosure.

Please refer to FIG. 6, which shows a flowchart of a method for selecting transmission resource provided by an embodiment of the present disclosure. The method can be applied to the system architecture shown in FIG. 1. The method includes the following steps.

Step 220: The terminal device determines the target transmission resource during the resource selection process.

For example, the target transmission resource determined by the terminal device in the resource selection stage includes the transmission resource within the time unit u. For example, the terminal device determines the target transmission resource in the time unit n, and the target transmission resource includes the transmission resource within the time unit u.

For example, the time unit u can be a single time unit, such as time unit m where resource x for performing pre-emption check is located in FIG. 4; or the time unit u can be a plurality of time units, such as the time unit a where resource y for performing re-evaluation is located and the time unit b where resource z for performing re-evaluation is located in FIG. 4; or pre-emption check and re-evaluation may also be combined, and the time unit u includes time unit m, time unit a, and time unit b.

Step 241: The terminal device performs a re-evaluation and/or a pre-emption process on the resources within the target transmission resource, and selects candidate time units from the first resource selection window. The candidate time units at least include a first time unit, for example, time unit u. The time unit u is a time unit where the resources that need to perform the re-evaluation and/or pre-emption process are located.

The first resource selection window is a resource selection window corresponding to the re-evaluation and/or pre-emption process based on partial listening.

For example, the time unit u includes at least two time units.

The candidate time units selected during the re-evaluation and/or pre-emption process based on partial listening for different resources corresponding to at least two time units are different.

Alternatively, the candidate time units selected during the re-evaluation and/or pre-emption process based on partial listening for different resources corresponding to at least two time units are the same.

When the candidate time units selected during the re-evaluation and/or pre-emption process based on partial listening for different resources corresponding to at least two time units are different, the re-evaluation and/or pre-emption process based on partial listening of at least two time units are performed separately.

When the candidate time units selected during the re-evaluation and/or pre-emption process based on partial listening for different resources corresponding to at least two time units are the same, the re-evaluation and/or pre-emption process based on partial listening for at least two time units are performed simultaneously (or "combined") or performed separately.

For example, the terminal device performs a re-evaluation and/or a pre-emption process in time unit p, the set of time units where all resources on which the re-evaluation and/or pre-emption process is required to be performed in time unit p are located is W. When W includes more than one time unit, Example 1: the terminal device perform re-evaluation and/or pre-emption process on resources corresponding to different time units within W. For example, the time unit W includes time units corresponding to resource x, resource y, and resource z. The terminal device first performs re-evaluation and/or pre-emption process on resource x (i.e. setting time unit u=time unit of resource x), then performs re-evaluation and/or pre-emption process on resource y (i.e. setting time unit u=time unit of resource y), and finally performs re-evaluation and/or pre-emption process on resource z (i.e. setting time unit u=time unit of resource y).

That is, different resources are evaluated separately, as shown in FIG. 4. Resources x, y, and z are evaluated separately, and the candidate time unit selected for each evaluation in the separate evaluation may be different. For example, time unit u includes W time units, where W is a positive integer. The terminal device selects candidate time units for the target transmission resource corresponding to each time unit in W time units, and performs re-evaluation and/or pre-emption process based on partial listening, where w is a positive integer not greater than W.

Alternatively, example 2: the terminal device performs process respectively for resources that require re-evaluation and resources that require pre-emption process. For example, time unit W contains time units corresponding to resource x, resource y, and resource z, where the pre-emption process needs to be performed on resource x, while re-evaluation needs to be performed on resource y and resource z. The terminal device can perform pre-emption on resource x (i.e. setting u=the time resource of resource x), and perform re-evaluation on resources y, z (i.e. setting u=the time unit set of resources y, z).

That is, different resources are evaluated separately based on the different needs for re-evaluation or pre-emption. As shown in FIG. 4, resource x needs to perform pre-emption, while resource y, and resource z need to perform re-evaluation. The terminal device performs pre-emption evaluation on resource x, and performs re-evaluation on resource y and resource z. The candidate time units selected in the pre-emption evaluation of resource x are different from the candidate time units selected in the re-evaluation of resources y and z. The candidate time units selected in the re-evaluation of resource y and resource z are identical.

Alternatively, example 3: the terminal device performs a re-evaluation and/or a pre-emption process on resources corresponding to all time unit within time unit W (i.e. setting time unit u=the set of time units corresponding to resources x, y, z).

That is, different resources are evaluated together, as shown in FIG. 4. Resource x, resource y, and resource z are all evaluated within one time unit, and time unit u includes all the corresponding time units of x, y, and z. The candidate time units selected in re-evaluation and/or pre-emption of resource x, resource y, and resource z are identical. For example, time unit u includes W time units, where W is a positive integer. The terminal device performs partial listening based re-evaluation and/or pre-emption process for the W time units based on the partial listening results corresponding to the W time units in the candidate time units.

For example, time unit u can be understood as a set u of time units, which includes at least one time unit.

For example, the terminal device at least can use partial listening based re-evaluation and/or pre-emption process in a variety of situations.

Situation 1: in a case where the terminal device uses a partial listening based resource selection process, re-evaluation and/or pre-emption process based on the partial listening are used to process the target transmission resource.

That is, if the terminal device adopts a partial listening based resource selection process during the resource selection stage, the partial listening method is also used during the re-evaluation and/or pre-emption of selected or reserved resources.

Situation 2: in a case where the terminal device uses a full listening based resource selection process or other non-partial listening based resource selection process, a re-evaluation and/or a pre-emption process based on the partial listening are used to process the target transmission resource.

That is, when the terminal adopts a full listening based resource selection process during the resource selection stage, the partial listening method can also be used during the re-evaluation and/or pre-emption of selected or reserved resources.

At this point, the terminal device can trigger the re-evaluation and/or pre-emption process based on partial listening in two ways:

1) In a case where the configuration information is configured to use partial listening, the terminal device uses a re-evaluation and/or a pre-emption process based on partial listening to process the target transmission resource. The configuration information includes at least one of the first configuration information transmitted by the access network device, the second configuration information transmitted by the high-level, and the pre-configuration information.

2) In a case where the attribute of the data to be transmitted meets the triggering condition, the terminal device uses a re-evaluation and/or a pre-emption process based on partial listening to process the target transmission resource.

For example, the terminal device determines whether to use partial listening based re-evaluation and/or pre-emption process based on base station configuration, high-level configuration, or pre-configuration information.

For example, the terminal device determines whether to use a partial listening based re-evaluation and/or pre-emption process based on attributes such as the priority of the data to be transmitted and the cast type (communication type). Cast type includes one of unicast, groupcast, and broadcast.

For example, the terminal device selects candidate time units from the first resource selection window for re-evaluation and/or pre-emption. The candidate time units at least include time unit u. Based on the partial listening results corresponding to the candidate time units, re-evaluation and/or pre-emption process based on partial listening are performed for the target transmission resource. The first resource selection window can be the resource selection window corresponding to the time slot m when the terminal triggers a re-evaluation and/or pre-emption process based on partial listening in time slot m. The terminal device needs to listen on a set of time units corresponding to the candidate time units.

For example, as shown in FIG. 4, when re-evaluation and/or pre-emption are performed in time slot m, the first resource selection window is from m−T3+T1 to m−T3+T2. The time unit m corresponding to resource x and the time unit a corresponding to resource y are selected from the first resource selection window as candidate time units. Listen for side-link control information on the time domain resources corresponding to time unit m and time unit a in the first resource listening window to determine whether time unit m and time unit a have been pre-empted by other terminal devices.

The temporal location and number of candidate time units can be determined by the terminal device itself. The terminal device can obtain the minimum number threshold of candidate time units by receiving configuration information of the access network or reading pre-configuration information. Candidate time units can only include time unit u, or can include a plurality of time units including time unit u.

For example, time unit u can be a set of time units. As shown in FIG. 4, a pre-emption check of resource x in time unit m, a re-evaluation of resource y in time unit a, and a re-evaluation of resource z in time unit b are performed simultaneously in time unit m−T3. The candidate time units can only include time unit m, time unit a or time unit b, or the candidate time units can include a plurality of time units including time unit m, time unit a, and time unit b.

For example, the terminal device selects L time units in the first resource selection window to obtain candidate time units, where L is a positive integer.

The value of L is equal to or not less than a preset value. The preset value is a value configured by the base station or the preset value is a pre-configured value. Or L=the number of time units within time unit u. The candidate time units include at least time unit u.

That is, L is equal to the number of time units within time unit u. Alternatively, L is a positive integer not less than a first threshold. The first threshold is a pre-configured value or a value configured by the network device. Or, L is equal to the number of transmission resource within time unit u.

In summary, the method provided in this embodiment selects candidate time units from the first resource selection window during re-evaluation and/or pre-emption based on partial listening. The candidate time units at least include time unit u. The time unit u is a time unit corresponding to the resource that needs re-evaluation and/or pre-emption. Re-evaluation and/or pre-emption based on partial listening is performed for the target transmission resource based on the partial listening results of the candidate time units, thereby reducing the listening time of the terminal device and reducing the energy consumption of the terminal device during the re-evaluation and/or pre-emption process.

For example, when selecting candidate time units, the selection method of L time units is related to the way resources are selected during the resource selection stage.

An exemplary embodiment of selecting L time units from the first resource selection window as candidate time units using the following four resource selection methods are given hereinafter.

Situation (1): In the resource selection stage, the terminal device uses partial listening based resource selection. At Step 1, Y time units are selected as candidate time units (target transmission resource) from the second resource selection window, and periodic resource reservation is performed. Y time units are listened and resource exclusion is performed in the second resource listening window. Then, at Step 2, selected transmission resource are selected from the candidate time units after resource exclusion.

Situation (2): In the resource selection stage, the terminal device uses partial listening based resource selection. At Step 1, Y time units are selected as candidate time units (target transmission resource) from the second resource selection window, without periodic resource reservation. In the second resource listening window, Y time units are listened and resource exclusion is performed. Then, at Step 2, selected transmission resource are selected from the candidate time units after resource exclusion.

Situation (3): In the resource selection stage, at Step 2, the terminal device determines B time units from the second resource selection window as the target transmission resource (selected transmission resource) and performs periodic resource reservation.

Situation (4): In the resource selection stage, at Step 2, the terminal device determines B time units from the second resource selection window as the target transmission resource (selected transmission resource), without performing periodic resource reservation.

Situation (1)

In a case where the terminal device selects Y time units from the second resource selection window to form a candidate resource set and performs periodic resource reservation, time unit u includes time units $\{(Sy1+k*T), \ldots, (Syu+k*T)\}$. Here, $y1< \ldots <yu$.

The second resource selection window is a resource selection window corresponding to the resource selection process. Sy is the y-th time unit out of Y time units. The resource reservation period for periodic resource reservation is T, k is a sequence number of a resource reservation period after resource selection, $y1 \ldots yu$ are positive integers not greater than Y, Y is a positive integer, and T is a positive number. For example, y1 is the smallest time unit in time unit u.

Optionally, the value of L is related to Y time units.

Optional, L is equal to $Y-y1+1$. Or, L is greater than or equal to $Y-y1+1$. Or, L is equal to Y. Or, L is greater than or equal to Y.

Optionally, the L time units include the time units $(Sy1+k*T)$ corresponding to time unit u to the last time unit $(SY+k*T)$ in the k-th resource reservation period.

As an example, the candidate resource set (target transmission resource) includes Y time units selected by the terminal device from the second resource selection window, as well as $Y*k$ time units obtained through periodic resource reservation based on Y time units.

When selecting time-frequency resources for time unit n, the terminal device uses partial listening based resource selection. During resource selection, Y time units {S1, . . . , SY} are selected in the second resource selection window to form a candidate resource set, and periodic resource reservation is performed, with a resource reservation period of T. So u={Sy1+k*T, . . . , Syu+k*T}; Sy1 . . . Syu are the y1-th . . . yu-th time units within Y time units, and y1< . . . <yu. k is the sequence number of period of the resource reservation period where the time unit u is currently located, and k is a non-negative integer.

In an optional example, L time units at least include time units {Sy1+k*T, S(y1+1)+k*T, . . . , SY+k*T}. Or L candidate time units at least include time unit u.

Figure 7:
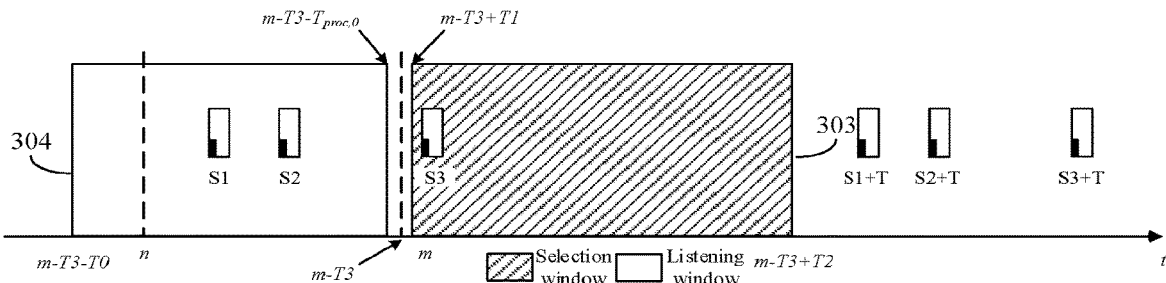
FIG. 7 is a schematic diagram of a method for selecting a transmission resource provided by an exemplary embodiment of the present disclosure.

For example, as shown in FIG. 7, the terminal device selects three time units {S1, S2, S3} to form a candidate resource set in time unit n, i.e. Y=3, and performs periodic resource reservation. The resource reservation period for periodic resource reservation is T, and the resource reservation period for periodic resource reservation is one time, that is, the value range of k is 0 or 1.

As shown in FIG. 7, when re-evaluation and/or preemption is performed for time unit u, time unit u includes time unit S3, i.e. y is 3 and k is 0. Then (Y−y+1)=(3−3+1)=1, L=1; or, L≥1; or, L=3; or, L≥3.

L time units include time unit S3. Since S3 is the last time unit in the 0th resource reservation period, L time units at least include time unit S3.

Figure 8:
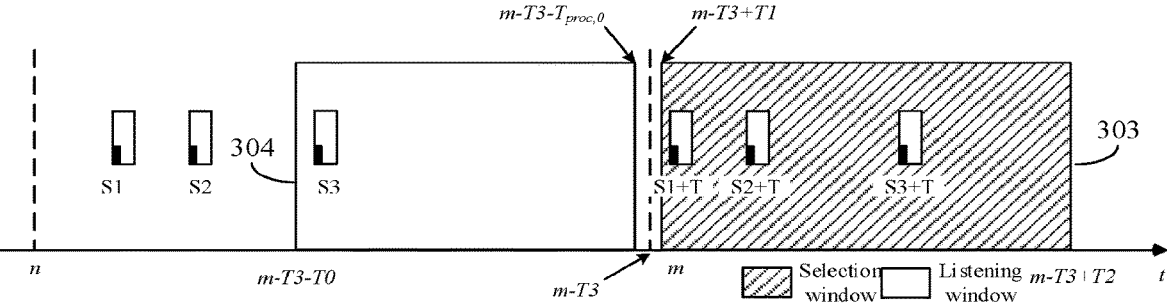
FIG. 8 is a schematic diagram of a method for selecting a transmission resource provided by an exemplary embodiment of the present disclosure.

For example, as shown in FIG. 8, the terminal device selects three time units {S1, S2, S3} to form a candidate resource set in time unit n, i.e. Y=3, and performs periodic resource reservation. The resource reservation period for periodic resource reservation is T, and the resource reservation period for periodic resource reservation is one time, that is, the value range of k is 0 or 1.

As shown in FIG. 8, when re-evaluation and/or preemption is performed for time unit u, time unit u includes time unit S1+T, time unit S2+T, and time unit S3+T, that is, y is 1, and k is 1. Then (Y−y+1)=(3−1+1)=3, L=3; or, L≥3; or, L=3; or, L≥3.

L time units include time unit S1+T, as well as time unit S2+T and time unit S3+T after time unit S1+T in the first resource reservation period. That is, the L time units at least include time unit S1+T, time unit S2+T, and time unit S3+T.

Alternatively, L time units at least include time unit S1+T.

In another optional example, L time units include time units within the first resource selection window in the Y time units within the k-th resource reservation period.

That is, L time units include time units of the k-th resource reservation period within the first resource selection window among the Y time units. For example, the k-th resource reservation period refers to a resource reservation period where the first time unit belonging to the Y time units within the first resource selection window is located.

For example, Y time units include S1, S2, S3, as well as S1+T, S2+T, S3+T, S1+2T, S2+2T, S3+2T obtained from periodic reservations for two times. When the first resource selection window includes S2+T, S3+T, S1+2T, S2+2T, S3+2T, since the first time unit belonging to Y time units in the first resource window is S2+T, k is taken as 1, then L time units include time units S2+T and S3+T of the first resource reservation period within the first resource window among the 9 time units mentioned above.

In another optional example, L time units include time units within the first resource selection window among Y time units.

That is, L time units include time units within the first resource selection window among the Y time units.

For example, Y time units include S1, S2, S3, as well as S1+T, S2+T, S3+T, S1+2T, S2+2T, S3+2T obtained from periodic reservations for two times. When the first resource selection window includes S2+T, S3+T, S1+2T, S2+2T, S3+2T, L time units include time units S2+T, S3+T, S1+2T, S2+2T, S3+2T within the first resource window among the 9 time units mentioned above.

Situation (2)

In a case where the terminal device selects Y time units from the second resource selection window to form a candidate resource set without periodic resource reservation, time unit u is equal to time units {Sy1, . . . , Syu}, y1< . . . <yu.

The second resource selection window is a resource selection window corresponding to the resource selection process. Sy1, . . . , Syu are the y1-th, . . . , and yu-th time units out of Y time units. y1, . . . , yu are positive integers not greater than Y, and Y is a positive integer.

Optionally, the value of L is related to Y time units.

Optional, L is equal to Y−y1+1; or, L is greater than or equal to Y−y1+1; or, L is equal to Y; or, L is greater than or equal to Y.

In an optional example, L time units include the time unit Sy1 corresponding to time unit u in the candidate resource set to the last time unit SY in the candidate resource set.

As an example, the candidate resource set (target transmission resource) includes Y time units selected by the terminal device from the second resource selection window.

Optionally, L time units at least include time units {Sy1, S (y1+1), . . . , SY}; or L candidate time units at least include time unit u.

When selecting time-frequency resources for time unit n, the terminal device uses partial listening based resource selection. During resource selection, Y time units {S1, . . . , SY} are selected in the second resource selection window to form a candidate resource set, without periodic resource reservation. So u={Sy1, . . . , Syu}; Sy1, . . . , Syu are the y1-th, . . . , and yu-th time units within Y time units.

Figure 9:
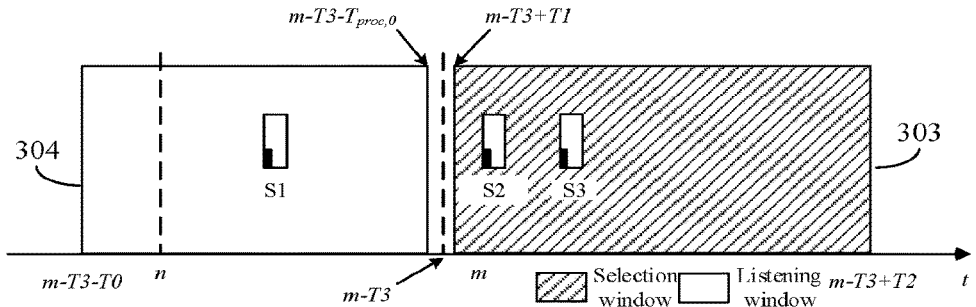
FIG. 9 is a schematic diagram of a method for selecting a transmission resource provided by an exemplary embodiment of the present disclosure.

For example, as shown in FIG. 9, the terminal device selects three time units {S1, S2, S3} to form a candidate resource set in time unit n, i.e. Y=3, without periodic resource reservation.

As shown in FIG. 9, when re-evaluation and/or preemption is performed for time unit u, time unit u includes time unit S2 and time unit S3, i.e. y is 2. Then (Y−y+1)= (3−2+1)=2, L=2; or, L≥2; or, L=3; or, L≥3.

L time units include time unit S2 and time unit S3 in the candidate resource set after time unit S2. L time units at least include time units S2 and S3.

Alternatively, L time units at least include time unit S2.

In another optional example, L time units include the time units within the first resource selection window among Y time units.

For example, Y time units include S1, S2, and S3. When the first resource selection window includes S2 and S3, L time units include the time units S2 and S3 within the first resource window among the above three time units.

Situation (3)

In a case where the terminal device determines B time units to form the target transmission resource during the resource selection process and performs periodic resource reservation, time unit u includes time units {(Rb1+k*T), . . . , (Rbu+k*T)}, b1< . . . <bu.

Rb1 . . . Rbu is the b1-th . . . bu-th time units out of B time units. The resource reservation period for periodic resource reservation is T, k is the sequence number of the resource reservation period after resource selection, b1 . . . bu are positive integers not greater than B, B is a positive integer, and T is a positive number.

Optionally, the value of L is related to B time units.

Optional, L is equal to B−b1+1; or, L is greater than or equal to B−b1+1; or, L is equal to B; or, L is greater than or equal to B.

In an optional example, L time units include time unit (Rb1+k*T) corresponding to time unit u to the last time unit (RB+k*T) in the k-th resource reservation period.

For example, the target transmission resource includes B time units selected by the terminal device through the resource selection process, as well as B*k time units obtained through periodic resource reservation based on B time units.

When selecting time-frequency resources for time unit n, the terminal device uses partial listening based resource selection. During resource selection, B time units {R1, . . . , RB} are selected in the second resource selection window to form the target transmission resource, and periodic resource reservations are performed, with a resource reservation period of T; So u={Rb1+k*T, . . . , Rbu+k*T}, b1< . . . <bu; Rb1, . . . , Rbu are the b1-th, . . . , bu-th time units within B time units, k is the sequence number of period of the resource reservation period where the time unit u is currently located, and k is a non-negative integer.

Figure 10:
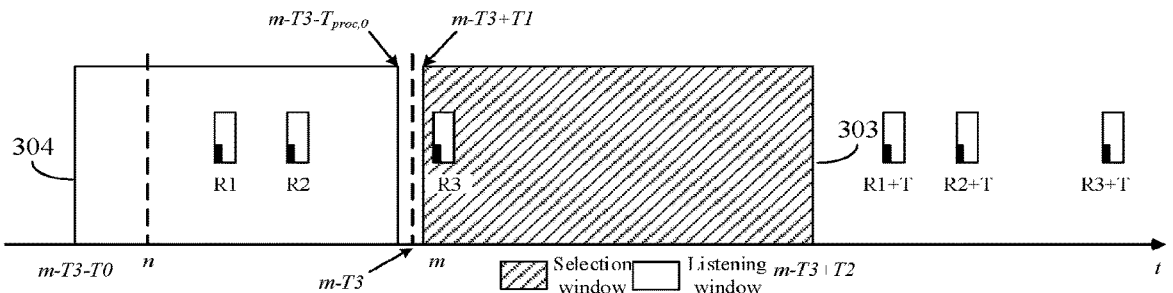
FIG. 10 is a schematic diagram of a method for selecting a transmission resource provided by an exemplary embodiment of the present disclosure.

For example, as shown in FIG. 10, the terminal device selects three time units {R1, R2, R3} to form a candidate resource set in time unit n, that is, B=3, and performs periodic resource reservations. The resource reservation period for periodic resource reservations is T, and the resource reservation period for periodic resource reservations is one time, that is, the value range of k is 0 or 1.

As shown in FIG. 10, when performing re-evaluation and/or pre-emption, time unit u includes time unit R3, that is, b is 3 and k is 0. Then (B−b+1)=(3−3+1)=1, L=1; or, L≥1; or, L=3; or, L≥3.

L time units include time unit R3. Since R3 is the last time unit in the 0th resource reservation period, L time units at least includes time unit R3.

Figure 11:
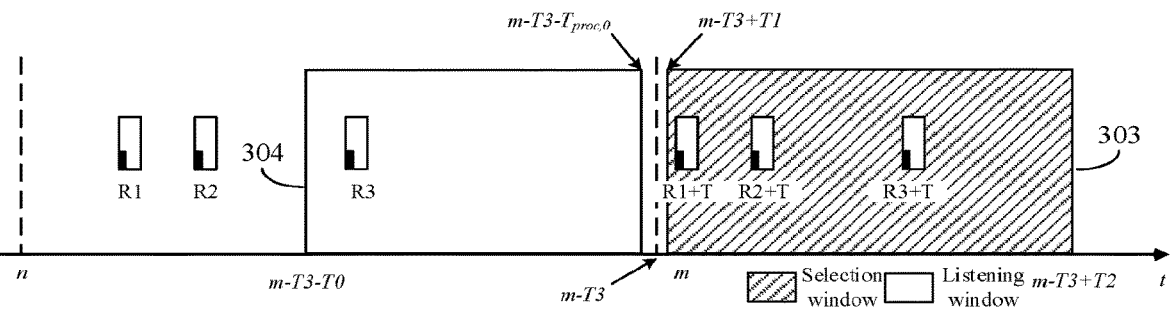
FIG. 11 is a schematic diagram of a method for selecting a transmission resource provided by an exemplary embodiment of the present disclosure.

For example, as shown in FIG. 11, the terminal device selects three time units {R1, R2, R3} to form a candidate resource set in time unit n, that is, B=3, and performs periodic resource reservation. The resource reservation period for periodic resource reservation is T, and the resource reservation period for periodic resource reservation is one time, that is, the value range of k is 0 or 1.

As shown in FIG. 11, when re-evaluation and/or pre-emption is performed for time unit u, time unit u is time unit R1+T, that is, b is 1 and k is 1. Then (B−b+1)=(3−1+1)=3, L=3; or, L≥3; or, L=3; or, L≥3.

L time units include time unit R1+T corresponding to time unit u, as well as the time units R2+T and R3+T after time unit R1+T in the first resource reservation period. L time units at least include time unit R1+T, time unit R2+T, and time unit R3+T.

Alternatively, L time units at least include time unit R1+T corresponding to time unit u.

In another optional example, L time units include time units within the first resource selection window in the B time units within the k-th resource reservation period.

That is, L time units include time units of the k-th resource reservation period within the first resource selection window among the B time units. For example, the k-th resource reservation period refers to a resource reservation period where the first time unit belonging to the B time units within the first resource selection window is located.

For example, B time units include R1, R2, R3, as well as R1+T, R2+T, R3+T, R1+2T, R2+2T, R3+2T obtained from periodic reservations for two times. When the first resource selection window includes R2+T, R3+T, R1+2T, R2+2T, R3+2T, and R3+2T, since the first time unit belonging to B time units in the first resource window is R1+T, k is taken as 1, then L time units include time units R2+T and R3+T of the first resource reservation period within the first resource window among the 9 time units mentioned above.

In another optional example, L time units include time units within the first resource selection window among B time units.

For example, B time units include R1, R2, R3, as well as R1+T, R2+T, R3+T, R1+2T, R2+2T, R3+2T obtained from periodic reservations for two times. When the first resource selection window includes R2+T, R3+T, R1+2T, R2+2T, R3+2T, and R3+2T, L time units include the time units R2+T, R3+T, R1+2T, R2+2T, and R3+2T within the first resource window among the 9 time units mentioned above.

Situation (4)

In a case where the terminal device determines B time units to form the target transmission resource during the resource selection process without periodic resource reservations, time unit u is equal to time units {Rb1, . . . , Rbu}, b1< . . . <bu.

Rb1, . . . , Rbu are the b1-th, . . . , bu-th time units out of B time units, b1, . . . , bu are positive integers not greater than B, and B is a positive integer.

Optionally, the value of L is related to B time units.

Optional, L is equal to B−b1+1; or, L is greater than or equal to B−b1+1; or, L is equal to B; or, L is greater than or equal to B.

Optionally, L time units include time unit Rb1 corresponding to the time unit u in the target transmission resource to the last time unit RB in the target transmission resource.

In an optional example, L time units at least include time units {Rb1+k*T, R (b1+1)+k*T, . . . , RB+k*T}; or L candidate time units at least include time unit u.

For example, the target transmission resource includes B time units selected by the terminal device through the resource selection process.

When selecting time-frequency resources for time unit n, the terminal device uses partial listening based resource selection. When selecting resources, B time units {R1, . . . , RB} are selected in the second resource selection window to form the target transmission resource, without periodic resource reservation; So u={Rb1, . . . , Rbu}, b1< . . . , <bu; Rb is the b1-th, . . . bu-th time units Within B time units.

Figure 12:
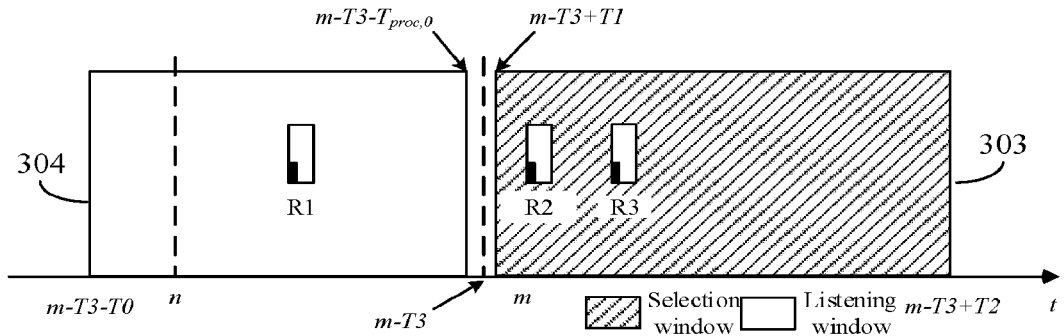
FIG. 12 is a schematic diagram of a method for selecting a transmission resource provided by an exemplary embodiment of the present disclosure.

For example, as shown in FIG. 12, the terminal device selects three time units {R1, R2, R3} to form a candidate resource set in time unit n, i.e. B=3, without periodic resource reservation.

As shown in FIG. 12, when performing re-evaluation and/or pre-emption, time unit u includes time unit R2 and time unit R3, i.e. b is 2. Then (B−b+1)=(3−2+1)=2, L=2; or, L≥2; or, L=3; or, L≥3.

L time units include time unit R2 and time unit R3 after time unit R2 in the target transmission resource. L time units at least include time units R2 and R3.

Alternatively, L time units at least include time unit R2.

In another optional example, L time units include time units within the first resource selection window among B time units.

For example, B time units include R1, R2, and R3. When the first resource selection window includes R2 and R3, L time units include time units R2 and R3 within the first resource window among the above three time units.

Figure 13:
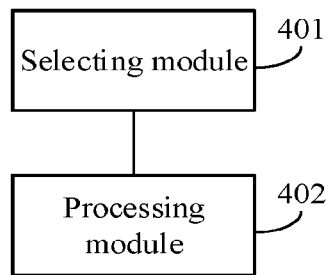
FIG. 13 is a structural block diagram of a device for selecting a transmission resource provided in an exemplary embodiment of the present disclosure.

FIG. 13 shows a structural block diagram of a transmission resource selection device provided in an exemplary embodiment of the present disclosure. The device can be implemented as a terminal device or as a part of the terminal device. The device includes the following modules.

Selecting module 401 is configured to determine target transmission resource during the resource selection process.

Processing module 402 is configured to process the target transmission resource using a re-evaluation and/or a preemption process based on partial listening.

In an optional embodiment, the processing module 402 is configured to process the target transmission resource using a re-evaluation and/or a pre-emption process based on partial listening, in a case of using a resource selection process based on partial listening.

In an optional embodiment, the processing module 402 is configured to process the target transmission resource using a re-evaluation and/or a pre-emption process based on partial listening in a case where the configuration information is configured to use the partial listening.

The configuration information includes at least one of the first configuration information transmitted by the access network device, the second configuration information transmitted by the upper layer, and the pre-configuration information.

In an optional embodiment, the processing module 402 is configured to process the target transmission resource using a re-evaluation and/or a pre-emption process based on partial listening in a case where the attribute of the data to be transmitted meets the triggering condition.

In an optional embodiment, the target transmission resource includes transmission resource within time unit u.

The processing module 402 is configured to select candidate time units from the first resource selection window, and the candidate time units at least include the time unit u.

The processing module 402 is configured to perform partial listening based re-evaluation and/or pre-emption process on the target transmission resource based on the partial listening results corresponding to the candidate time unit.

The first resource selection window is a resource selection window corresponding to the partial listening based re-evaluation and/or pre-emption process.

In an optional embodiment, the processing module 402 is configured to select L time units in the first resource selection window to obtain the candidate time units, where L is a positive integer.

In an optional embodiment, L is equal to the number of time units within the time unit u.

Or, L is a positive integer not less than a first threshold. The first threshold is a pre-configured value or a value configured by network device.

In an optional embodiment, in a case where Y time units are selected in the second resource selection window to form a candidate resource set and periodic resource reservations are performed, time unit u includes time units (Sy1+k*T) to time units (Syu+k*T);

The second resource selection window is a resource selection window corresponding to the resource selection process. Sy1 is the y1-th time unit among the Y time units. Syu is the yu-th time unit among the Y time units. The resource reservation period for periodic resource reservations is T, k is the sequence number of the resource reservation period after resource selection, y1, yu are positive integers not greater than Y, Y is a positive integer, and T is a positive number, U is a positive integer.

In an optional embodiment, in a case where Y time units are selected in the second resource selection window to form a candidate resource set without periodic resource reservation, time unit u is equal to time unit Sy.

The second resource selection window is a resource selection window corresponding to the resource selection process. Sy is the y-th time unit among the Y time units, y is a positive integer not greater than Y, and Y is a positive integer.

In an optional embodiment, the value of L is related to the Y time units.

In an optional embodiment, L is equal to $Y-y1+1$;

Or, L is greater than or equal to $Y-y1+1$.

Or, L is equal to Y.

Or, L is greater than or equal to Y.

In an optional embodiment, the value of L is related to the Y time units.

In an optional embodiment, L is equal to $Y-y+1$.

Or, L is greater than or equal to $Y-y+1$;

Or, L is equal to Y.

Or, L is greater than or equal to Y.

In an optional embodiment, L time units include time unit $(Sy1+k*T)$ to the last time unit $(SY+k*T)$ in the k-th resource reservation period.

In an optional embodiment, L time units include time unit Sy in the candidate resource set to the last time unit SY in the candidate resource set.

In an optional embodiment, when B time units are determined during the resource selection process to form the target transmission resource and periodic resource reservation is performed, time unit u includes time unit $(Rb1+k*T)$ to time unit $(Rbu+k*T)$.

Rb1 is the b-th time unit among the B time units, Rbu is the bu-th time unit among the B time units, the resource reservation period for the periodic resource reservations is T, k is the sequence number of the resource reservation period after the resource selection, b1 and bu are positive integers not greater than B, B is a positive integer, T is a positive number, and u is a positive integer.

In an optional embodiment, in a case where B time units are determined during the resource selection process to form the target transmission resource without periodic resource reservation, the time unit u is equal to time unit Rb.

Rb is the b-th time unit among the B time units, b is a positive integer not greater than B, and B is a positive integer.

In an optional embodiment, the value of L is related to the B time units.

In an optional embodiment, L is equal to $B-b1+1$; or, L is greater than or equal to $B-b1+1$; or, L is equal to B; or, L is greater than or equal to B.

In an optional embodiment, the value of L is related to the B time units.

In an optional embodiment, L is equal to $B-b+1$.

Or, L is greater than or equal to $B-b+1$.

Or, L is equal to B.

Or, L is greater than or equal to B.

In an optional embodiment, the L time units include time unit (Rb1+k*T) to the last time unit (RB+k*T) in the k-th resource reservation period.

In an optional embodiment, the L time units include time unit Rb in the target transmission resource to the last time unit RB in the target transmission resource.

In an optional embodiment, the time unit u at least includes two time units.

The re-evaluation and/or pre-emption process based on the partial listening of the at least two time units are performed separately.

Or, the re-evaluation and/or pre-emption process based on the partial listening of the at least two time units are performed simultaneously.

In an optional embodiment, the L time units include time units within the first resource selection window among the Y time units within the k-th resource reservation period.

Or, the L time units include time units within the first resource selection window among the Y time units.

In an optional embodiment, the L time units include time units within the first resource selection window among the Y time units.

In an optional embodiment, the L time units include time units within the first resource selection window among the B time units within the k-th resource reservation period.

Or, the L time units include time units within the first resource selection window among the B time units.

In an optional embodiment, the L time units include time units within the first resource selection window among the B time units.

Figure 14:
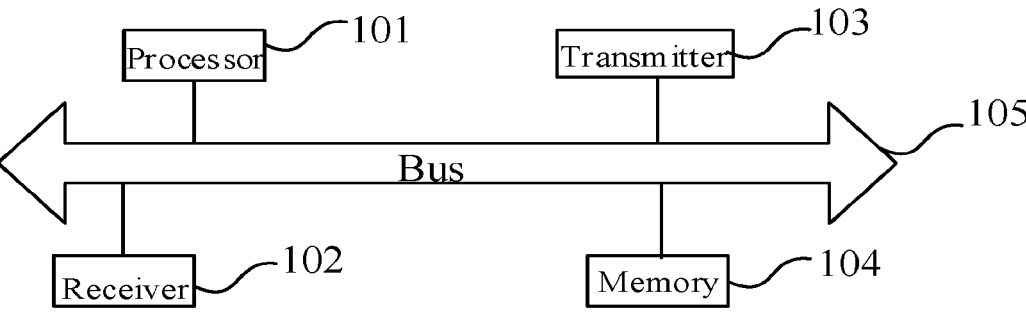
FIG. 14 is a schematic structural diagram of a communication device provided by an exemplary embodiment of the present disclosure.

FIG. 14 shows a schematic diagram of the structure of a communication device (terminal device or network device) provided in an exemplary embodiment of the present disclosure. The communication device includes a processor 101, a receiver 102, a transmitter 103, a memory 104, and a bus 105.

Processor 101 includes one or more processing cores. The processor 101 executes various functional applications and information processing by running software programs and modules.

Receiver 102 and transmitter 103 can be implemented as a communication component, and the communication component can be a communication chip.

Memory 104 is connected to processor 101 through bus 105.

The memory 104 can be configured to store at least one instruction, and the processor 101 is configured to execute the at least one instruction to implement the various steps in the above method embodiments.

In addition, memory 104 can be implemented by any type of volatile or non-volatile storage device, or a combination of them. Volatile or non-volatile storage devices include but are not limited to: magnetic disks or optical disks, Electrically Erasable Programmable Read Only Memory (EE-PROM), Erasable Programmable Read Only Memory (EPROM), Static Random Access Memory (SRAM), Read Only Memory (ROM), Magnetic Memory, Flash Memory, and Programmable Read Only Memory (PROM).

When the communication device is implemented as a terminal device, the processor and transceiver in the communication device referred to in the embodiments of the present disclosure can perform the steps performed by the terminal device in any of the methods shown above, which will not be repeated here.

In one possible implementation, when the communication device is implemented as a terminal device, the processor is configured to determine target transmission resource during the resource selection process; and process the target transmission resource using a re-evaluation and/or a pre-emption process based on partial listening.

In exemplary embodiments, a computer readable storage medium is also provided, where at least one instruction, at least one program, code set, or instruction set is stored, and the at least one instruction, at least one program, code set, or instruction set is loaded and executed by a processor to achieve the transmission resource selection method executed by communication device provided by the above method embodiments.

In exemplary embodiments, there is also provided a chip including programmable logic circuits and/or program instructions for implementing the transmission resource selection method as described in the above aspects when the chip is running on a computer device.

In exemplary embodiments, there is also provided a computer program product that, when running on a processor of a computer device, causes the computer device to perform the transmission resource selection method as described in the above aspects.

According to an aspect of the present disclosure, there is provided a transmission resource selection method, performed by a terminal for V2X transmission, including: determining a target transmission resource during a resource selection process; and processing the target transmission resource using a re-evaluation and/or a pre-emption process based on partial listening.

In some embodiments, processing the target transmission resource using the re-evaluation and/or the pre-emption process based on the partial listening includes: in a case of using the resource selection process based on the partial listening, processing the target transmission resource by using the re-evaluation and/or the pre-emption process based on the partial listening.

In some embodiments, processing the target transmission resource using the re-evaluation and/or the pre-emption process based on the partial listening includes: in a case where configuration information is configured to use the partial listening, processing the target transmission resource using the re-evaluation and/or the pre-emption process based on the partial listening; wherein the configuration information includes at least one of first configuration information transmitted by an access network device, second configuration information transmitted by an upper layer, and pre-configuration information.

In some embodiments, processing the target transmission resource using the re-evaluation and/or the pre-emption process based on the partial listening includes: in a case where an attribute of data to be transmitted meets a triggering condition, processing the target transmission resource using the re-evaluation and/or the pre-emption process based on the partial listening.

In some embodiments, the target transmission resource includes a transmission resource within a time unit u; and processing the target transmission resource using the re-evaluation and/or the pre-emption process based on the partial listening includes: selecting candidate time units from a first resource selection window, wherein the candidate time units at least include the time unit u; and performing the re-evaluation and/or the pre-emption process based on the partial listening for the target transmission resource based on partial listening results corresponding to the candidate time units; wherein the first resource selection window is a resource selection window corresponding to the re-evaluation and/or the preemption process based on the partial listening.

In some embodiments, selecting the candidate time units from the first resource selection window includes: obtaining the candidate time units by selecting L time units in the first resource selection window, wherein L is a positive integer.

In some embodiments, L is equal to a number of time units within the time unit u; or L is a positive integer not less than a first threshold, and the first threshold is a pre-configured value or a value configured by a network device.

In some embodiments, in a case where Y time units are selected in a second resource selection window to form a candidate resource set and periodic resource reservations are performed, the time unit u includes a time unit $(Sy1+k*T)$ to a time unit $(Syu+k*T)$; wherein the second resource selection window is a resource selection window corresponding to the resource selection process, Sy1 is a y1-th time unit among the Y time units, Syu is a yu-th time unit among the Y time units, a resource reservation period for the periodic resource reservations is T, k is a k-th resource reservation period after the resource selection, y1 and yu are positive integers not greater than Y, Y is a positive integer, T is a positive number, and u is a positive integer.

In some embodiments, in a case where Y time units are selected in a second resource selection window to form a candidate resource set without periodic resource reservation, the time unit u is equal to a time unit Sy; wherein the second resource selection window is a resource selection window corresponding to the resource selection process, Sy is a y-th time unit among the Y time units, y is a positive integer not greater than Y, and Y is a positive integer.

In some embodiments, a value of L is related to the Y time units.

In some embodiments, L is equal to $Y-y1+1$; or L is greater than or equal to $Y-y1+1$; or L is equal to Y; or L is greater than or equal to Y.

In some embodiments, a value of L is related to the Y time units.

In some embodiments, L is equal to $Y-y+1$; or, L is greater than or equal to $Y-y+1$; or, L is equal to Y; or, L is greater than or equal to Y.

In some embodiments, the L time units include the time unit $(Sy1+k*T)$ to a last time unit $(SY+k*T)$ in the k-th resource reservation period.

In some embodiments, the L time units include the time unit Sy in the candidate resource set to a last time unit SY in the candidate resource set.

In some embodiments, in a case where B time units are determined in the resource selection process to form the target transmission resource and periodic resource reservations are performed, the time unit u includes a time unit $(Rb1+k*T)$ to a time unit $(Rbu+k*T)$; wherein Rb1 is a b1-th time unit among the B time units, Rbu is a bu-th time unit among the B time units, a resource reservation period for the periodic resource reservations is T, k is a k-th resource reservation period after the resource selection process, b1 and bu are positive integers not greater than B, B is a positive integer, T is a positive number, and u is a positive integer.

In some embodiments, in a case where B time units are determined in the resource selection process to form the target transmission resource without periodic resource reservation, the time unit u is equal to a time unit Rb; wherein Rb is a b-th time unit among the B time units, b is a positive integer not greater than B, and B is a positive integer.

In some embodiments, a value of L is related to the B time units.

In some embodiments, L is equal to $B-b1+1$; or L is greater than or equal to $B-b1+1$; or L is equal to B; or L is greater than or equal to B.

In some embodiments, a value of L is related to the B time units.

In some embodiments, L is equal to $B-b+1$; or L is greater than or equal to $B-b+1$; or L is equal to B; or L is greater than or equal to B.

In some embodiments, the L time units include the time unit $(Rb1+k*T)$ to a last time unit $(RB+k*T)$ in the k-th resource reservation period.

In some embodiments, the L time units include the time unit Rb in the target transmission resource to a last time unit RB in the target transmission resource.

In some embodiments, the time unit u includes at least two time units; the candidate time units selected during the re-evaluation and/or the pre-emption process based on the partial listening for different resources corresponding to the at least two time units are different; or, the candidate time units selected during the re-evaluation and/or the pre-emption process based on the partial listening for different resources corresponding to the at least two time units are same.

In some embodiments, the L time units include time units within the first resource selection window among the Y time units within the k-th resource reservation period; or, the L time units include time units within the first resource selection window among the Y time units.

In some embodiments, the L time units include time units within the first resource selection window among the Y time units.

In some embodiments, the L time units include time units within the first resource selection window among the B time units within the k-th resource reservation period; or, the L time units include time units within the first resource selection window among the B time units.

In some embodiments, the L time units include time units within the first resource selection window among the B time units.

According to an aspect of the present disclosure, there is provided a transmission resource selection device, including: a selecting module configured to determine a target transmission resource during a resource selection process; and a processing module configured to process the target transmission resource using a re-evaluation and/or a pre-emption process based on partial listening.

In some embodiments, the processing module is configured to process the target transmission resource using the re-evaluation and/or the preemption process based on the partial listening, in a case of using the resource selection process based on the partial listening.

In some embodiments, the processing module is configured to process the target transmission resource using the re-evaluation and/or the preemption process based on the partial listening in a case where configuration information is configured to use the partial listening; wherein the configuration information includes at least one of first configuration information transmitted by an access network device, second configuration information transmitted by an upper layer, and pre-configuration information.

In some embodiments, the processing module is configured to process the target transmission resource using the re-evaluation and/or the preemption process based on the partial listening in a case where an attributes of data to be transmitted meets a triggering condition.

In some embodiments, the target transmission resource includes a transmission resource within a time unit u; and the processing module is configured to select candidate time units from a first resource selection window, wherein the candidate time units at least include the time unit u; the processing module is configured to perform the re-evaluation and/or the pre-emption process based on the partial listening for the target transmission resource based on partial listening results corresponding to the candidate time units; wherein the first resource selection window is a resource selection window corresponding to the re-evaluation and/or the preemption process based on the partial listening.

In some embodiments, the processing module is configured to obtain the candidate time units by selecting L time units in the first resource selection window, wherein L is a positive integer.

In some embodiments, L is equal to a number of time units within the time unit u; or L is a positive integer not less than a first threshold, and the first threshold is a pre-configured value or a value configured by a network device.

In some embodiments, in a case where Y time units are selected in a second resource selection window to form a candidate resource set and periodic resource reservations are performed, the time unit u includes a time unit (Sy1+k*T) to a time unit (Syu+k*T); wherein the second resource selection window is a resource selection window corresponding to the resource selection process, Sy1 is a y1-th time unit among the Y time units, Syu is a yu-th time unit among the Y time units, a resource reservation period for the periodic resource reservations is T, k is a k-th resource reservation period after the resource selection, y1 and yu are positive integers not greater than Y, Y is a positive integer, T is a positive number, and u is a positive integer.

In some embodiments, in a case where Y time units are selected in a second resource selection window to form a candidate resource set without periodic resource reservation, the time unit u is equal to a time unit Sy; wherein the second resource selection window is a resource selection window corresponding to the resource selection process, Sy is a y-th time unit among the Y time units, y is a positive integer not greater than Y, and Y is a positive integer.

In some embodiments, a value of L is related to the Y time units.

In some embodiments, L is equal to Y−y1+1; or L is greater than or equal to Y−y1+1; or, L equals Y; or L is greater than or equal to Y.

In some embodiments, a value of L is related to the Y time units.

In some embodiments, L is equal to Y−y+1; or L is greater than or equal to Y−y+1; or, L is equal to Y; or L is greater than or equal to Y.

In some embodiments, the L time units include the time unit (Sy1+k*T) to a last time unit (SY+k*T) in the k-th resource reservation period.

In some embodiments, the L time units include the time unit Sy in the candidate resource set to a last time unit SY in the candidate resource set.

In some embodiments, in a case where B time units are determined in the resource selection process to form the target transmission resource and periodic resource reservations are performed, the time unit u includes a time unit (Rb1+k*T) to a time unit (Rbu+k*T); wherein Rb1 is a b1-th time unit among the B time units, Rbu is a bu-th time unit among the B time units, a resource reservation period for the periodic resource reservations is T, k is a k-th resource reservation period after the resource selection process, b1 and bu are positive integers not greater than B, B is a positive integer, T is a positive number, and u is a positive integer.

In some embodiments, in a case where B time units are determined in the resource selection process to form the target transmission resource without periodic resource reservation, the time unit u is equal to a time unit Rb; wherein Rb is a b-th time unit among the B time units, b is a positive integer not greater than B, and B is a positive integer.

In some embodiments, a value of L is related to the B time units.

In some embodiments, L is equal to B−b1+1; or L is greater than or equal to B−b1+1; or, L is equal to B; or L is greater than or equal to B.

In some embodiments, a value of L is related to the B time units.

In some embodiments, L is equal to B−b+1; or L is greater than or equal to B−b+1; or L is equal to B; or L is greater than or equal to B.

In some embodiments, the L time units include the time unit (Rb1+k*T) to a last time unit (RB+k*T) in the k-th resource reservation period.

In some embodiments, the L time units include the time unit Rb in the target transmission resource to a last time unit RB in the target transmission resource.

In some embodiments, the time unit u includes at least two time units; the candidate time units selected during the re-evaluation and/or the preemption process based on the partial listening for different resources corresponding to the at least two time units are different; or the candidate time units selected during the re-evaluation and/or the pre-emption process based on the partial listening for different resources corresponding to the at least two time units are same.

In some embodiments, the L time units include time units within the first resource selection window among the Y time units within the k-th resource reservation period; or the L time units include time units within the first resource selection window among the Y time units.

In some embodiments, the L time units include time units within the first resource selection window among the Y time units.

In some embodiments, the L time units include time units within the first resource selection window among the B time units within the k-th resource reservation period; or the L time units include time units within the first resource selection window among the B time units.

In some embodiments, the L time units include time units within the first resource selection window among the B time units.

According to an aspect of the present disclosure, there is provided a terminal device, including a processor and a transceiver connected to the processor; wherein, the processor is configured to determine a target transmission resource during a resource selection process; and process the target transmission resource using a re-evaluation and/or a pre-emption process based on partial listening.

According to an aspect of the present disclosure, there is provided a computer readable storage medium, storing executable instructions, wherein the executable instructions are loaded and executed by a processor to achieve the above-mentioned methods.

According to an aspect of the present disclosure, there is provided a chip, including a programmable logic circuit or program, wherein the chip is configured to implement the above-mentioned methods.

Those skilled in the art can understand that all or part of the steps to implement the above embodiments can be completed through hardware, or by instructing relevant hardware through programs. The programs can be stored in a computer-readable storage medium. The above mentioned storing medium can be read-only memory, magnetic disk, or optical disk, etc.

The above are only optional embodiments of this disclosure and are not intended to limit it. Any modifications, equivalent replacements, improvements, etc. made within the spirit and principles of this disclosure shall be included in the scope of protection of this disclosure.

What is claimed is:

1. A transmission resource selection method, performed by a terminal for sidelink transmission, comprising:

determining a target transmission resource during a resource selection process, the target transmission resource comprises a transmission resource within a first set of slots; and processing the target transmission resource using at least one of a re-evaluation or a pre-emption process based on partial sensing that includes, selecting candidate slots from a first resource selection window; and performing at least one of the re-evaluation or the pre-emption process based on the partial sensing for the target transmission resource based on partial sensing results corresponding to the candidate slots;

wherein the first resource selection window is a resource selection window corresponding to at least one of the re-evaluation or the preemption process based on the partial sensing, wherein (i) a set of Y candidate slots (S1, . . . , SY) is selected in a second resource selection window in the resource selection process to form a candidate resource set and periodic resource reservations are performed, a resource reservation period for the periodic resource reservations is T, the first set of slots comprises slots (Sy1+k*T, . . . , Syu+k*T); (Sy1, . . . , Syu) are y1-th slot to yu-th slot within the Y candidate slots respectively, k is a cycle number of a resource reservation period in which the first set of slots is located, k is non-negative integer, T is a positive number; and the candidate slots at least comprise slots (Sy1+k*T, . . . , SY+k*T), or the candidate slots at least comprise the first set of slots; or (ii) a set of Y candidate slots (S1, . . . , SY) is selected in a second resource selection window in the resource selection process to form a candidate resource set without periodic resource reservation, the first set of slots comprises slots (Sy1, . . . , Syu); (Sy1, . . . , Syu) are y1-th slot to yu-th slot within the Y candidate slots respectively, wherein y1 and yu are positive integers not greater than Y, Y is a positive integer; and the candidate slots at least comprise slots (Sy1, . . . , SY), or the candidate slots at least comprise the first set of slots.

2. The method according to claim 1, wherein:

the resource selection process based on the partial sensing is used, or configuration information is configured to use the partial sensing, wherein the configuration information comprises at least one of first configuration information transmitted by an access network device, second configuration information transmitted by an upper layer, and pre-configuration information, or an attribute of data to be transmitted meets a triggering condition.

3. The method according to claim 1, wherein selecting the candidate slots from the first resource selection window comprises:

obtaining the candidate slots by selecting L slots in the first resource selection window, wherein L is a positive integer.

4. The method according to claim 3, wherein a value of L is related to the Y candidate slots.

5. The method according to claim 4, wherein

L is equal to Y−y1+1; or

L is greater than or equal to Y−y1+1; or

L is equal to Y; or

L is greater than or equal to Y.

6. The method according to claim 3, wherein a set of Y candidate slots (S1, . . . , SY) are selected in a second resource selection window in the resource selection process to form a candidate resource set and periodic resource reservations are performed, the L slots comprise the slots (Sy1+k*T, . . . , SY+k*T) in the k-th resource reservation period, or a set of Y candidate slots (S1, . . . , SY) is selected in a second resource selection window in the resource selection process to form a candidate resource set and periodic resource reservations are performed, the L slots comprise slots within the first resource selection window among the Y candidate slots within the k-th resource reservation period, or a set of Y candidate slots (S1, . . . , SY) is selected in a second resource selection window in the resource selection process to form a candidate resource set without periodic resource reservation, the L slots comprise slots within the first resource selection window among the Y candidate slots.

7. The method according to claim 3, wherein a set of Y candidate slots (S1, . . . , SY) is selected in a second resource selection window in the resource selection process to form a candidate resource set without periodic resource reservation, the L slots comprise the slots (Sy, . . . , SY) in the candidate resource set, Sy is a y-th slot among the Y candidate slots, or a set of Y candidate slots (S1, . . . , SY) is selected in a second resource selection window in the resource selection process to form a candidate resource set without periodic resource reservation, the L slots comprise slots within the first resource selection window among the Y candidate slots.

8. A transmission resource selection method, performed by a terminal for sidelink transmission, comprising:

determining a target transmission resource during a resource selection process, the target transmission resource comprises a transmission resource within a first set of slots; and processing the target transmission resource using at least one of a re-evaluation or a pre-emption process based on partial sensing that includes, selecting candidate slots from a first resource selection window; and performing at least one of the re-evaluation or the pre-emption process based on the partial sensing for the target transmission resource based on partial sensing results corresponding to the candidate slots;

wherein the first resource selection window is a resource selection window corresponding to at least one of the re-evaluation or the preemption process based on the partial sensing, wherein (i) a set of B candidate slots is determined in the resource selection process to form the target transmission resource and periodic resource reservations are performed, the first set of slots comprises slots (Rb1+k*T, . . . , Rbu+k*T), or (ii) a set of B candidate slots is determined in the resource selection process to form the target transmission resource without periodic resource reservation, the first set of slots is equal to a slot Rb, wherein Rb1 is a b1-th slot among the B candidate slots, Rbu is a bu-th slot among the B candidate slots, a resource reservation period for the periodic resource reservations is T, k is a cycle number of a resource reservation period where the first set of slots is located, and k is non-negative integer, b1 and bu are positive integers not greater than B, B is a positive integer, T is a positive number, Rb is a b-th slot among the B candidate slots, b is a positive integer not greater than B, and B is a positive integer.

9. The method according to claim 8, wherein selecting the candidate slots from the first resource selection window comprises:

obtaining the candidate slots by selecting L slots in the first resource selection window, wherein L is a positive integer.

10. The method according to claim 9, wherein a value of L is related to the B candidate slots.

11. The method according to claim 10, wherein

L is equal to B−b1+1; or

L is greater than or equal to B−b1+1; or

L is equal to B; or

L is greater than or equal to B.

12. The method according to claim 9, wherein a set of B candidate slots is determined in the resource selection process to form the target transmission resource and periodic resource reservations are performed, the L slots comprise the slots (Rb1+k*T, . . . , RB+k*T) in the k-th resource reservation period, RB is a B-th slot among the B candidate slots, or a set of B candidate slots is determined in the resource selection process to form the target transmission resource and periodic resource reservations are performed, the L slots comprise slots within the first resource selection window among the B candidate slots within the k-th resource reservation period, or a set of B candidate slots is determined in the resource selection process to form the target transmission resource without periodic resource reservation, the L slots comprise slots within the first resource selection window among the B candidate slots.

13. The method according to claim 9, wherein a set of B candidate slots is determined in the resource selection process to form the target transmission resource without periodic resource reservation, the L slots comprise the slots (Rb, . . . , RB) in the target transmission resource, or a set of B candidate slots is determined in the resource selection process to form the target transmission resource without periodic resource reservation, the L slots comprise slots within the first resource selection window among the B candidate slots.

14. The method according to claim 1, wherein the first set of slots comprises at least two slots, the candidate slots selected during at least one of the re-evaluation or the pre-emption process based on the partial sensing for different resources corresponding to the at least two slots are different, or the candidate slots selected during at least one of the re-evaluation or the pre-emption process based on the partial sensing for different resources corresponding to the at least two slots are same.

15. A terminal device, comprising a processor and a transceiver connected to the processor, wherein the processor is configured to:

determine a target transmission resource during a resource selection process, the target transmission resource comprises a transmission resource within a first set of slots; and process the target transmission resource using at least one of a re-evaluation or a preemption process based on partial sensing that includes, selecting candidate slots from a first resource selection window; and performing at least one of the re-evaluation or the pre-emption process based on the partial sensing for the target transmission resource based on partial sensing results corresponding to the candidate slots;

wherein the first resource selection window is a resource selection window corresponding to at least one of the re-evaluation or the preemption process based on the partial sensing, wherein (i) a set of Y candidate slots (S1, . . . , SY) is selected in a second resource selection window in the resource selection process to form a candidate resource set and periodic resource reservations are performed, a resource reservation period for the periodic resource reservations is T, the first set of slots comprises slots (Sy1+k*T, . . . , Syu+k*T); (Sy1, . . . , Syu) are y1-th slot to yu-th slot within the Y candidate slots respectively, k is a cycle number of a resource reservation period in which the first set of slots is located, and k is non-negative integer, T is a positive number; and the candidate slots at least comprise slots (Sy1+k*T, . . . , SY+k*T), or the candidate slots at least comprise the first set of slots; or (ii) a set of Y candidate slots (S1, . . . , SY) is selected in a second resource selection window in the resource selection process to form a candidate resource set without periodic resource reservation, the first set of slots comprises slots (Sy1, . . . , Syu); (Sy1, . . . , Syu) are y1-th slot to yu-th slot within the Y candidate slots respectively, wherein y1 and yu are positive integers not greater than Y, Y is a positive integer; and the candidate slots at least comprise slots (Sy1, . . . , SY), or the candidate slots at least comprise the first set of slots.

16. A non-transitory computer readable storage medium, storing executable instructions, wherein the executable instructions are loaded and executed by a processor to cause the processor to perform the method according to claim 1.

17. A terminal device, comprising a processor and a transceiver connected to the processor, wherein the processor is configured to perform the method according to claim 8.

18. A non-transitory computer readable storage medium, storing executable instructions, wherein the executable instructions are loaded and executed by a processor to cause the processor to perform the method according to claim 8.

19. The method according to claim 8, wherein the first set of slots comprises at least two slots, the candidate slots selected during at least one of the re-evaluation or the pre-emption process based on the partial sensing for different resources corresponding to the at least two slots are different, or the candidate slots selected during at least one of the re-evaluation or the pre-emption process based on the partial sensing for different resources corresponding to the at least two slots are same.

* * * * *